Dec. 27, 1927.

G. N. HILL 1,654,217

MOTOR VEHICLE STEERING APPARATUS

Filed Feb. 24, 1927

Inventor
GEORGE N. HILL
BY
Attorney

Patented Dec. 27, 1927.

1,654,217

UNITED STATES PATENT OFFICE.

GEORGE N. HILL, OF HAMILTON, ONTARIO, CANADA, ASSIGNOR TO LOUIS C. FLAHERTY, OF HAMILTON, ONTARIO, CANADA.

MOTOR-VEHICLE STEERING APPARATUS.

Application filed February 24, 1927. Serial No. 170,572.

My invention relates to motor vehicle steering apparatus consisting of novel spring devices combined with the usual spindle units and tie rod and yieldably tensioned against the spindle bodies and against the spindle arm pivot bodies.

The principal object of the invention is to provide a device for preventing play and vibration both in the spindle body and axle yoke connections and in the spindle arm pivot body and tie rod yoke connections.

Another important object is to provide such a device which can be readily applied to automobiles already in use, and that cannot interfere with easy and efficient steering of the same.

Another object is to provide a device of the class specified which will not tend to bias the steering in either direction but which will rather tend to influence the same in a straight course.

A still further object is to provide a device of the class specified which will be simple, efficient, durable, and inexpensive to manufacture.

These, together with further objects, may be attained by the construction, combination and arrangement of the parts as will be hereinafter more fully described, illustrated in the accompanying drawing, and ascertained in the claims hereunto annexed.

Referring to the drawing.

Similar reference numerals refer to corresponding parts throughout the several views.

Figure 1:
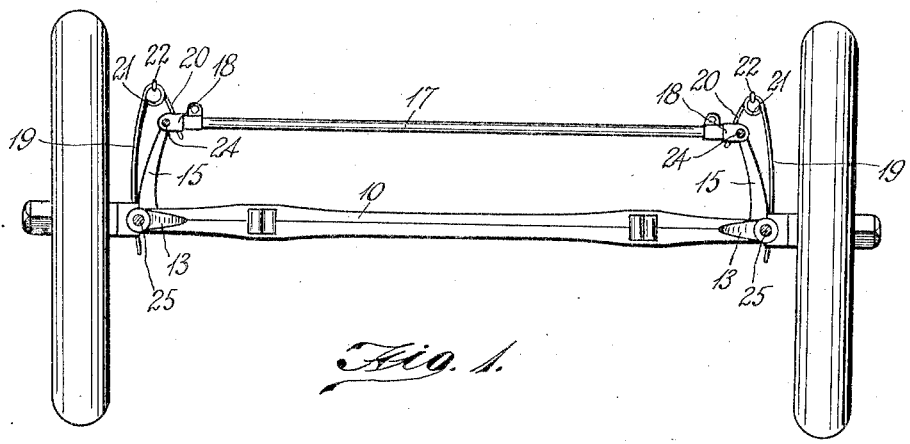
Figure 1 is a plan view of the front axle assembly of a well known make of automobile with the improved steering apparatus in connection therewith as constructed in accordance with this invention.

The front axle is designated upon the drawing by the numeral 10; the spindle body unit comprising the usual spindles 11, spindle bodies 12 pivoted between the axle yoke arms 13 and 14, the spindle or steering arms 15 having at their ends the pivot bodies 16, and the tie rod 17 provided with the yokes 18 in which are pivoted the said pivot bodies 16.

The spring device comprises a spring wire doubled upon itself forming a pair of spaced arms 19 roughly parallel to each other, the doubled over portion 20 being U-shaped. The arms 19 are provided with coils 21, and the coils are preferably loosely connected by means of a link 22 to prevent accidental spreading or bulging apart of the arms.

Where the coils 21 occur, the spring is bent so that the arms 19 lie more or less at right angles with the U shaped section prior to being sprung into position on the spindle unit, whereupon it assumes a substantially V shaped form.

In applying the spring device, the arms 19 are passed through the space bounded by the converging axle yoke arms 13 and 14 and the spindle body 12, one arm 19 disposed above and one below the spindle arm socket 23 so as to embrace the latter.

Figure 2:
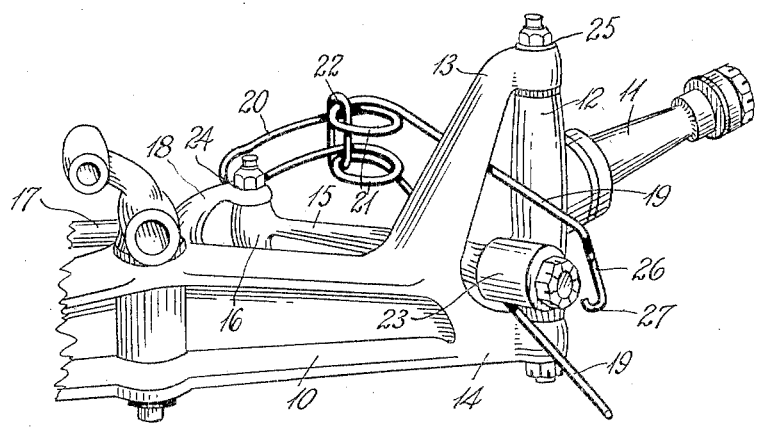
Figure 2 is an enlarged detailed perspective view of one end of an axle assembly with the spring device about to be connected thereto; and, Figure 3 is a view similar to Figure 2 showing the spring device after it is properly connected.
Figure 3:
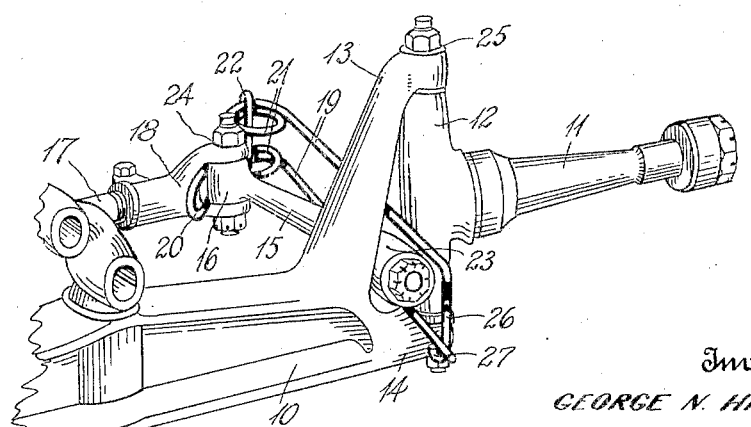

To facilitate the installation the respective spindle unit may be turned rearwardly to the limit of its range of travel as shown in Figure 2, which brings the relative position of the respective parts closer in accord with the unsprung form of the spring. The U shaped section 20 of the spring is then inserted between the yoke arms of the tie rod 17 and the spindle arm pivot body 16.

When the springs are applied to both spindle body units, the spindles 11 are tensionally held in a position parallel to the axle 10 by the opposing tension of the respective springs, but the tension is not sufficient to interfere with easy steering, or to bias the same. There is, however, sufficient tension to slightly influence the steering in a straight course, this being a desirable feature in steering.

In use, the U shaped section 20 bears tensionally against the yoke 18 and also bears tensionally against the spindle arm pivot body 16 so as to prevent vibration of the latter with the tie rod and spindle arm bolt 24, and the arms 19 have sliding bearing against the spindle body 12 so as to prevent vibration of the same with the spindle bolt 25.

Although the free ends of the arms 19 may be left uncoupled, in order to protect them against accidental damage coupling them together is desirable. For this purpose, one of the arms may be made longer than the other and bent towards the other, the end of the thus bent portion 26 being formed into a hook 27 for engagement with the free end of the other arm.

There has thus been produced a simple and useful device of the class described and for the purposes specified, and now having fully described the invention and the manner in which it is to be performed in such manner that any person skilled in the art to which it appertains could construct, apply, and use the same, I claim:—

1. In an apparatus of the class described, the combination with a front axle yoke, a tie rod yoke, and a spindle body unit including a spindle body pivoted in the front axle yoke, a spindle arm projecting rearwardly from the spindle body, and a spindle arm pivot body formed on the end of the arm and pivoted in the tie rod yoke, of a spring passed between the arms of the tie rod yoke and bearing against said yoke and bearing against the spindle arm pivot body, and another portion of the spring passed between the arms of said axle yoke and bearing against the spindle body.

2. In an apparatus of the class described, the combination with a front axle yoke, a tie rod yoke, and a spindle body unit including a spindle body pivoted in the front axle yoke, a spindle arm projecting rearwardly from the spindle body, and a spindle arm pivot body formed on the end of the arm and pivoted in the tie rod yoke, of a spring passed between the arms of the tie rod yoke and bearing against said yoke and bearing against the spindle arm pivot body, and another portion of the spring passed between the arms of said axle yoke and having sliding bearing against the spindle body.

3. In an apparatus of the class described, the combination with a front axle yoke, a tie rod yoke, and a spindle body unit including a spindle body pivoted in the front axle yoke, a spindle arm projecting rearwardly from the spindle body socket, and a spindle arm pivot body formed on the end of the arm and pivoted in the tie rod yoke, of a spring passed between the arms of the tie rod yoke and bearing against said yoke and bearing against the spindle arm pivot body, and another portion of the spring comprising two arms passed between the arms of said axle yoke, one of the spring arms being disposed above and the other below said spindle arm socket and bearing against the spindle body.

In testimony whereof I have affixed my signature.

GEORGE N. HILL.